UNITED STATES PATENT OFFICE.

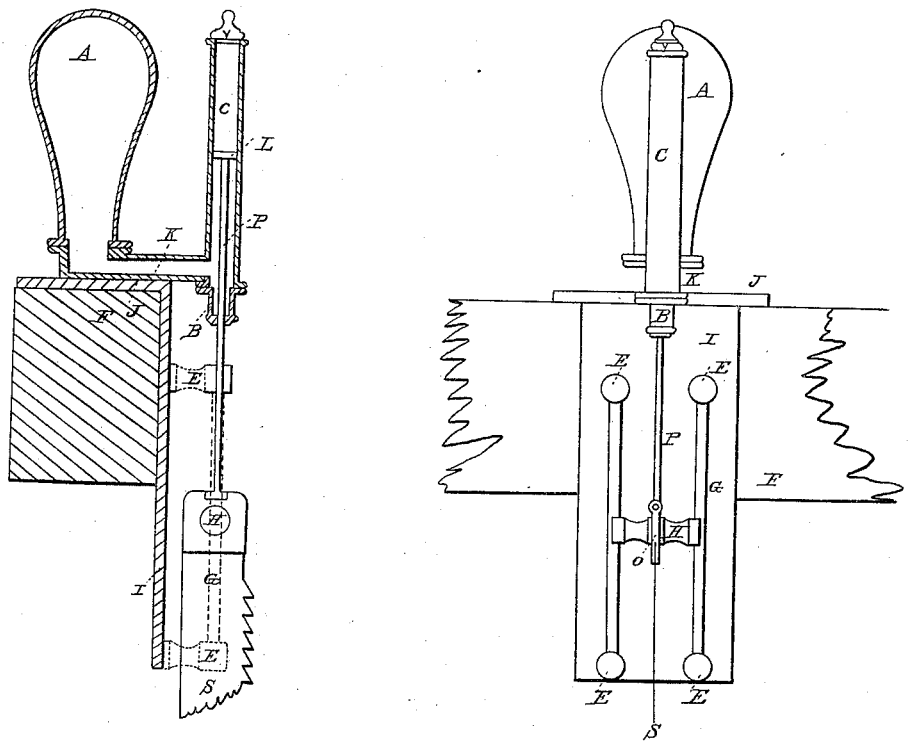
J. Rankin,
Reciprocating Saw Mill.
Nº 10,020. Patented Sep. 13, 1853.

JAMES RANKIN, OF DETROIT, MICHIGAN.

HANGING MILL-SAWS.

Specification of Letters Patent No. 10,020, dated September 13, 1853.

*To all whom it may concern:*

Be it known that I, JAMES RANKIN, of Detroit, in the county of Wayne and State of Michigan, have invented a new and improved mode of obtaining the tension on mill and other saws without adding to the weight to be reciprocated, and thereby combining the stability of the sash-saw with the speed of the muley and effecting a saving of power and timber; and I do hereby declare that the following is a full and exact description thereof, reference being had to the accompanying drawings.

The nature of my invention consists in providing mill and other saws at one or both ends with a cylinder and piston, said piston being coupled to the end of the saw by its rod—then by applying atmospheric of other pressure with any elastic fluid on the side of the piston nearest the saw. Any desired tension may be obtained on the saw, (while it is at perfect liberty to reciprocate following the piston and vice versa,) thereby obviating the heavy sash or frame, while its qualities are retained and the speed of the muley saw may be obtained, without its weight and thickness and consequent loss of power and timber.

To enable others to make and use my invention I will proceed to describe its construction and operation.

I construct my saws of thinner plate than muley saws and hang them with or without girders in any of the known forms, and apply thereto the other appendages of such saws. But in order to obviate the slow motion of the heavy sash or frame (while its thin saw is retained) and the weight and thickness of the muley saw (and consequent wide saw kerf and loss of power and timber) and the heavy pitman (or connecting rod) (as it may be lighter). I make a cylinder as shown at "C" in the accompanying drawing, and place it in line with the saw S, and with bolts or otherwise make it fast to the feeder beam "F" or other frame work, then with a piston "L" packed in any known form and having its rod "P" coupled to the clutch "H," on the end of the saw—and by having a valve V on the end of the cylinder farthest from the saw—opening outward, allowing the contents of the cylinder to escape, when the piston moves toward the valve and preventing their return when the piston returns, consequently forming a partial vacuum and thereby producing atmospheric pressure on the opposite side of the piston and consequently tension on the saw. I have also provided for any desired pressure by placing a stuffing box "B" on the end of the cylinder packed in any known form for the piston rod to work through and having a capacious air vessel "A" large enough to receive the contents of the cylinder without materially increasing the pressure—connected by a large port or opening "K" to the cylinder at its end nearest the saw—then by passing compressed air or its equivalent into the air vessel, (which compressed air or its equivalent may be forced into the air vessel by the common air pump or any other known methods) any tension may be obtained on the saw that is necessary to keep a thin saw steady and thereby obviating the weight of the sash, and weight (partially) and thickness of the muley saw and consequent width of saw kerf and thereby loss of timber and power by having so much weight to reciprocate and timber to cut.

What I claim is—

The arrangement of an air chamber cylinder and valve in the manner substantially described for the purpose of straining saws in motion by the elastic pressure of compressed air or its equivalent.

JAMES RANKIN.

In presence of—
  E. I. WALKER,
  HIRAM WALKER.